United States Patent Office 3,192,248
Patented June 29, 1965

3,192,248
METHOD FOR PREPARING NITRONITRITES AND DINITROPARAFFINS FROM ALPHA-OLEFINS
Giovanni A. Bonetti, Wilmington, Del., Chester B. de Savigny, Rancho Cordova, Calif., and Conrad Michalski, Media, and Rudolph Rosenthal, Broomall, Pa., assignors to The Atlantic Refining Company, Philadelphia, Pa., a corporation of Pennsylvania
No Drawing. Filed Feb. 26, 1964, Ser. No. 347,398
17 Claims. (Cl. 260—467)

This application is a continuation-in-part of our copending application, Serial No. 224,731, filed September 19, 1962, entitled "Nitrogen-Containing Derivatives of Alpha-Olefins," now abandoned.

This invention relates to a method for preparing nitronitrites and dinitroparaffins from alpha-olefins and, more particularly, it relates to a method for preparing nitronitrites having the formula $$R-CH-CH_2-NO_2$$
$$|$$
$$ONO$$

and dinitroparaffins having the formula $$R-CH-CH_2-NO_2$$
$$|$$
$$NO_2$$

wherein R is a normal alkyl radical containing from 1 to 22 carbon atoms.

Considerable progress has been made in the synthesis, separation, and recovery of nitrogen-containing aliphatic compounds. However, work in this area has been concerned primarily with the production of mono-nitroparaffins by the vapor phase reactions of various alkanes with nitrating agents, including $HNO_3$, $NO$, $NO_2$ and $N_2O_4$.

Additional work has been carried out on the nitration of olefins utilizing $N_2O_4$ either in the absence of a solvent or in the presence of ester or ether solvents described as the complexing type. In carrying out these reactions, relatively low temperatures have been employed, i.e., from about $-25°$ C. to $30°$ C. in the liquid phase. It has been found under these conditions that comparatively large quantities of by-products are formed with the result that the maximum yields of the desired nitronitrites and dinitroparaffins are limited to 75 to 85 percent. Moreover, the by-products which are formed frequently interfere with the subsequent conversion of the nitronitrites and dinitroparaffins into the desired nitrogen containing products such as the nitroalcohols and nitroolefins.

The present invention is directed to a method for the preparation of nitrogen-containing compounds from alpha-olefins, which compounds may be utilized in the synthesis of other desirable nitrogen contaning compounds; e.g., nitroalcohols and nitroolefins, wherein the alkyl group of the compound is straight chain. In particular, the invention is directed to the preparation of mixtures of nitronitrites and dinitroparaffins, in substantially quantitative yields.

It is, therefore, an object of this invention to provide a process for the nitration of normal alpha-olefins.

It is a further object of this invention to provide a process for the nitration of normal alpha-olefins with an equilibrium mixture of $NO_2$ and $N_2O_4$ to produce a mixture of nitronitrites and dinitroparaffins in substantially quantitative yields.

Other objects of this invention will be apparent from the description and claims that follow.

As used in this specification and appended claims, the term "nitronitrites" means compounds having the formula $$R-CH-CH_2-NO_2$$
$$|$$
$$ONO$$

wherein R is a normal alkyl radical containing from 1 to 22 carbon atoms; the term "dinitroparaffins" means compounds having the formula $$R-CH-CH_2-NO_2$$
$$|$$
$$NO_2$$

wherein R is a normal alkyl radical containing from 1 to 22 carbon atoms; the term "nitroalcohols" means compounds having the formula $$R-CH-CH_2-NO_2$$
$$|$$
$$OH$$

wherein R is a normal alkyl radical containing from 1 to 22 carbon atoms; and the term "nitroolefins" means compounds having the formula $R-CH=CH-NO_2$, wherein R is a normal alkyl radical containing from 1 to 22 carbon atoms.

In accordance with this invention a normal alpha-olefin (a mono-olefin with a terminal double bond) containing from 3 to 24 carbon atoms, or a mixture of these, is dissolved in a paraffinic hydrocarbon solvent and thereafter contacted with an equilibrium mixture of $NO_2$ and $N_2O_4$. The paraffinic hydrocarbon solvent ranges from 20 volume percent to 99 volume percent of the solution; preferably, however, from 50 volume percent to 90 volume percent of the solution. The equilibrium mixture of $NO_2$ and $N_2O_4$ may be contacted with the alpha-olefin in the solvent either in a batch reaction or a continuous reaction.

In the batch-type reaction the normal alpha-olefin dissolved in the solvent is placed in a reaction vessel and the gaseous equilibrium mixture of $NO_2$ and $N_2O_4$ is bubbled into the solution with sufficient agitation to provide thorough contacting. Upon completion of the reaction the solvent and any excess nitrating agent may be removed from the products by distillation or the excess nitrating agent is stripped from the product-solvent mixture with nitrogen, helium or similar inert gas which will not react either with the products or with the $NO_2$ and $N_2O_4$. The latter procedure is employed when it is desired to retain the nitronitrite-dinitroparaffin product in the solvent as a solution for subsequent processing.

In the continuous reaction system the alpha-olefin dissolved in the paraffinic solvent is introduced into the top of a packed column or tower along with the equilibrium mixture of $NO_2$ and $N_2O_4$. The gas and liquid are allowed to come in contact while passing downwardly over the packing in the column and the products dissolved in the solvent are removed from the bottom of the column. If desired, the solvent and any excess nitrating agent may be removed by distillation or the effluent from the reactor column may be passed into a stripping column where the excess $NO_2$ and $N_2O_4$ are stripped from the solution with nitrogen or similar inert gas as has been described leaving the products in solution.

The amount of equilibrium mixture of $NO_2$ and $N_2O_4$ may vary within wide limits. It has been found that satisfactory results are obtained when the amount of equilibrium mixture used ranges between about 0.5 mole per mole of normal alpha-olefin and 2.4 moles per mole of normal alpha-olefin. Although amounts less than one mole of equilibrium mixture per mole or normal alpha-olefin will result in unreacted olefin in the product, the reaction is substantially quantitative with respect to the olefin converted and thus less than the mole-per-mole ratio of equilibrium mixture to normal alpha-olefin may be used without producing undesired by-products. Moreover, amounts in excess of 2.4 moles of mixture per mole of normal alpha-olefin may be used, however, no noticeable improvements are apparent.

The nitration reaction occurs with extreme rapidity and therefore the time of contact between the olefin and nitrating agent may be very short, i.e., 0.1 second. Since the reaction is exothermic, however, it is preferable in order to control the reaction temperature, to employ times of from 15 to 60 seconds in a continuous column reaction system and generally from about 3 minutes to 10 minutes for the time of addition of the nitrating agent to the olefin in a batch reaction system. Thus the contact time may be in the range of from 0.1 second to 10 minutes.

It is advantageous that the reaction temperature be at least 50° C. in order to preclude the production of nitronitrates, ketones, aldehydes and mononitroparaffins, since such products interfere with subsequent separation steps. The temperature may range up to about 150° C. The preferred temperature range is from 50° C. to 90° C.

The paraffinic hydrocarbon solvent may be a normal, cyclic or branched hydrocarbon having from 6 to 24 carbon atoms in the molecule, preferably from 6 to 15 carbon atoms, or mixtures of such hydrocarbons. Examples of such hydrocarbons which may be used as solvents are n-hexane, cyclohexane, methylcyclohexane, n-heptane, n-octane, iso-octane, n-nonane, n-decane, undecanes, dodecanes, tridecanes, tetradecanes, pentadecanes, hexadecanes and similar paraffinic hydrocarbons.

When the nitration is carried out in accordance with this method utilizing the described paraffinic hydrocarbon solvent there is produced a mixture of nitronitrites and dinitroparaffins in about a 1:1 weight ratio. It has also been found that these compounds are essentially the only compounds produced and therefore the reaction is substantially quantitative based on the alpha-olefin charge. The nitronitrites and dinitroparaffins, although they may be recovered by distilling off the solvent and any nitrating agent remaining in the solvent product reaction mixture, are preferably retained in the paraffinic hydrocarbon solvent as a solution since they are conveniently handled in this form for the subsequent hydrolysis steps leading to their conversion to other nitrogen derivatives to be described. The $NO_2$ and $N_2O_4$ mixture which is stripped from the solution may be recovered and reused.

The nitronitrites and dinitroparaffins have utility as intermediates in the production of other nitrogen containing compounds, thus, the mixture of nitronitrites and dinitroparaffins may be hydrolyzed at a temperature ranging between ambient temperatures and 100° C. for a period of time ranging between 1 minute and 2 hours in the presence of an aliphatic alcohol containing from 1 to 6 carbon atoms or a mixture of such an alcohol with water or with water alone. The quantity of alcohol, alcohol-water or water required to hydrolyze this mixture ranges from a minimum of 1 mole per mole of the nitronitrite up to 20 moles or more of the hydrolyzing agent. There is produced in this hydrolysis reaction a mixture of nitroalcohols and dinitroparaffins in about a 1:1 weight ratio, i.e., only the nitronitrites are hydrolyzed.

The mixture of nitroalcohols and dinitroparaffins from the hydrolysis step may be separated by any conventional method such as by silica gel chromatography. For example, upon passage of a solution of the nitroalcohols and dinitroparaffins contained in 2,2,4-trimethylpentane (iso-octane) through a column of silica gel which previously has been wetted with 2,2,4-trimethylpentane, the nitroalcohols and dinitroparaffins are adsorbed on the silica gel. The dinitroparaffins are removed first from the silica gel by elutriation with benzene. The nitroalcohols are subsequently removed from the silica gel by elutriation with diethyl ether. The dinitroparaffins are recovered by evaporating the benzene, and the nitroalcohols are recovered by evaporating the diethyl ether.

It has been found that the dinitroparaffins may be converted to the corresponding nitroolefins by hydrolyzing with an aqueous slurry of a Group II oxide, such as calcium oxide or magnesium oxide. The time of treatment ranges from about 10 minutes to about 1 hour, preferably from about 10 minutes to about 30 minutes. The reaction may be carried out at ambient or somewhat higher temperatures.

The nitroalcohols may be dehydrated to the corresponding nitroolefins by contacting them with an alcoholic alkali metal hydroxide solution. The total amount of alcoholic alkali metal hydroxide solution used must contain at least a stoichiometric amount of alkali metal hydroxide based on the amount of nitroalcohol to be converted and may contain up to about three times the stoichiometric amount or more, although no advantages are apparent for such higher amounts. The alcohol used in preparing the alcoholic alkali metal hydroxide solution may contain from 1 to 3 carbon atoms, preferably methyl or ethyl alcohol. Preferred alkali metal hydroxides are sodium hydroxide, and potassium hydroxide, with sodium hydroxide being the most preferred.

The following examples are provided to further illustrate the invention. In Examples I to VII, inclusive, a continuous reactor system was employed wherein the alpha-olefin solution in a paraffinic hydrocarbon solvent was passed downwardliy over glass bead packing in the column and therein contacted with an equilibrium mixture of $NO_2$ and $N_2O_4$. The contact times were in the range of from about 15 seconds to about 1 minute. Examples VIII and IX were batch reactions.

*Example I*

Into 190 ml. of 2,2,4-trimethylpentane there was passed 1.76 moles of propylene and 0.92 mole of equilibrium mixture of $NO_2$ and $N_2O_4$ at a temperature of 52° C. Upon evaporation of the 2,2,4-trimethylpentane and excess nitrating agent, infrared analysis of the reaction product showed that there was produced 1-nitro-2-propanolnitrite and 1,2-dinitropropane in about a 1:1 weight ratio. The product mixture was stirred with 200 ml. of methanol at ambient temperature for 25 minutes. There was recovered 16.5 grams of product which upon infrared analysis was identified as 1-nitro-2-propanol and 1,2-dinitropropane.

*Example II*

In 200 ml. of 2,2,4-trimethylpentane there was dissolved 0.25 mole of hexene-1. The solution was contacted with 0.58 mole of equilibrium mixture of $NO_2$ and $N_2O_4$ at a temperature of 55° C. Upon evaporation of the 2,2,4-trimethylpentane and excess nitrating agent, infrared analysis of the product (41.7 grams) showed that there was produced only 1-nitro-2-hexanolnitrite and 1,2-dinitrohexane in about a 1:1 weight ratio. The total product mixture was hydrolyzed overnight with 200 ml. of methanol at ambient temperature. Ten grams of the hydrolyzed product after removal of solvent and hydrolyzing agent was separated and there was recovered 4.4 grams of 1,2-dinitrohexane and 5.14 grams of 1-nitro-2-hexanol.

*Example III*

In 360 ml. of 2,2,4-trimethylpentane there was dissolved 0.9 moles of octene-1. The solution was contacted with 1.92 moles of equilibrium mixture of $NO_2$ and $N_2O_4$ at a temperature of 52° C. Upon evaporation of the 2,2,4-trimethylpentane and excess nitrating agent, infrared analysis of the product (183.6 grams) showed that there was produced only 1-nitro-2-octanol nitrite and 1,2-dinitrooctane in about a 1:1 weight ratio. To 29.7 grams of this product mixture there was added 20 ml. of 2,2,4-trimethylpentane. The mixture was heated to 70° C. Water (50 ml.) was added and the mixture was heated to 83° C. over a ten-minute period. Infrared analysis showed that 48.8 weight percent 1-nitro-2-octanol and 50.5 weight percent 1,2-dinitrooctane were produced.

*Example IV*

A solution of hexadecene-1 in 2,2,4-trimethylpentene was prepared by dissolving 10 parts by weight of the hexadecene-1 per 100 ml. of solution. This solution was charged at the rate of about 1000 ml. per hour along with an equilibrium mixture of $NO_2$ and $N_2O_4$ into a semi-plant scale reactor packed with glass beads. The quantity of equilibrium mixture was about 2.4 moles per mole of hexadecene-1 and the reaction temperature was maintained at 70° C. to 75° C. The excess nitrating agent was removed from the reactor effluent by means of a stream of nitrogen gas. The stripped effluent was then hydrolyzed with water at a temperature of about 80° C. for approximately 30 minutes. The aqueous layer was separated and the organic layer was stripped free of solvent under vacuum. The product obtained from the hydrolysis reaction analyzed: 52.1 weight percent of 1-nitrohexadecanol-2; 46.5 weight percent of 1,2-dinitrohexadecane; 0.2 weight percent of 1-nitrohexadecyl nitrate-2 and approximately 0.2 weight percent unidentified carbonyl compounds. No hexadecene-1, nitroolefin or nitronitrite was found in the product. These results show that the nitration step produced substantially quantitative yields of 1-nitro-2-hexadecanol nitrite and 1,2-dinitrohexadecane.

*Example V*

Pure hexadecene-1 in the absence of a solvent was passed into the same column described in Example IV, along with the same amount of nitrating agent and at the same rate as described in Example IV. The reaction temperature was also maintained at 75° C. and excess nitrating agent was stripped from the product with nitrogen. The stripped product was hydrolyzed with water in a manner similar to that described in Example IV. The product obtained following the hydrolysis analyzed 41.6 weight percent of 1-nitrohexadecanol-2; 45.3 weight percent of 1,2-dinitrohexadecane; 1.4 weight percent of 1-nitrohexadecylnitrate-2; 3.1 weight percent 1-nitrohexadecene-1 and approximately 3.5 weight percent unidentified carbonyl compounds. The comparison of the results from this example with Example IV clearly demonstrates that the use of a paraffinic hydrocarbon solvent provides the means of obtaining quantitative yields of the desired nitronitrites and dinitroparaffins.

*Example VI*

In 100 ml. of 2,2,4-trimethylpentane there was dissolved 0.114 mole of docosene-1. The solution was contacted with 0.26 mole of equilibrium mixture of $NO_2$ and $N_2O_4$ at a temperature of 54° C. Upon evaporation of the 2,2,4-trimethylpentane and excess nitrating agent, infrared analysis showed that there was produced only 1-nitro-2-docosanol nitrite and 1,2-dinitrodocosane in about a 1:1 weight ratio.

*Example VII*

In 100 ml. of cyclohexane there was dissolved 10 grams of octene-1. This solution was passed with an equilibrium mixture of $NO_2$ and $N_2O_4$ (0.2 mole) at a rate of 3.2 ml. per minute through a column maintained at 50° C. to 55° C. The product, 16.55 grams, was shown to be identical with that obtained in Example III.

*Example VIII*

Into a 500 ml. three-nicked flask were introduced 23.7 grams of decene-1 and 200 ml. of n-decane. The solution was heated to 140° C. and an equilibrium mixture of $NO_2$ and $N_2O_4$ was passed into the solution in an amount sufficient to nitrate all of the decene-1 while the solution was stirred and over a period of about 10 minutes. After hydrolysis of the product with water, the infrared analysis showed that it contained 1-nitrodecanol-2 and 1,2-dinitrodecane in about a 1:1 weight ratio.

*Example IX*

Into a 500 ml. three-necked flask were introduced 28 grams (0.25 mole) octene-1 and 300 ml. n-heptane. While the solution was stirred and maintained at a temperature of 70° C. to 75° C., 19 grams (0.205 mole) of an equilibrium mixture of $NO_2$ and $N_2O_4$ were passed in over a period of about 10 minutes. After removing the solvent and excess olefin by vacuum distillation, infrared analysis of the product showed it contained 1-nitro-2-octanolnitrite and 1,2-dinitrooctane in about a 1:1 weight ratio.

*Example X*

A column of silica gel 3 feet high and 1 inch in diameter was wetted with 250 ml. of 2,2,4-trimethylpentane. An 11.4 gram mixture of 1-nitro-2-octanol and 1,2-dinitrooctane as prepared in accordance with Example III was dissolved in 50 ml. of 2,2,4-trimethylpentane and absorbed onto the silica gel column. Upon passage of 750 ml. of benzene through the column and evaporation of the benzene there was recovered 4.9 grams of 1,2-dinitrooctane which was identified by infrared analysis. Upon subsequent passage of 500 ml. of diethyl ether through the column and evaporation of the ether, there was recovered 5.2 grams of 1-nitro-2-octanol which was identified by infrared analysis. This experiment demonstrates that the mixture produced in accordance with this invention may be separated by conventional methods.

From the foregoing examples, it has been demonstrated that normal alpha-olefins including those which are normally gaseous, liquid and solid, may be nitrated substantially quantitatively to a mixture of the corresponding nitronitrites and dinitroparaffins by the use of a paraffinic hydrocarbon solvent and elevated temperatures in accordance with this invention.

The nitrogen-containing derivatives of alpha-olefins prepared in accordance with this invention are useful as chemical intermediates as has been described, and in the production of other useful products by methods well-known to the art. The dinitroparaffins are useful as solvents and plasticizers, particularly for nitro-cellulose, and as has been described, the dinitroparaffins may be hydrolyzed to produce nitroolefins, which, in turn, are useful in the preparation of polymeric materials. The dinitroparaffins may be reduced by known methods to the corresponding diaminoparaffins and the diaminoparaffins, in turn, are useful in the preparation of polyamide resins, as crosslinking agents for epoxy resins and as solvents. The nitronitrites, because of their instability, are preferably hydrolyzed to the corresponding nitro-alcohols. The nitroalcohols, in turn, are exceedingly useful since they may be converted to anionic detergents by sulfation or non-anionic detergents by condensation with an alkylene oxide such as ethylene oxide. The nitroalcohols also are useful as solvents and plasticizers, particularly for nitrocellulose.

We claim:

1. A method for preparing nitronitrites having the formula

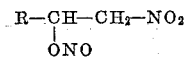

and dinitroparaffins having the formula

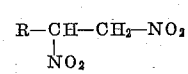

wherein R is a normal alkyl radical containing from 1 to 22 carbon atoms which comprises contacting a normal alpha-olefin having from 3 to 24 carbon atoms in the molecule and dissolved in a paraffinic hydrocarbon solvent having from 6 to 24 carbon atoms in the molecule with a nitrating agent consisting of an equilibrium mixture of NO₂ and N₂O₄ at a temperature in the range from 50° C. to 150° C. and thereafter recovering the nitronitrite and dinitroparaffin product.

2. The method according to claim 1 wherein the temperature is in the range from 50° C. to 90° C.

3. The method according to claim 1 wherein the paraffinic hydrocarbon solvent has from 6 to 15 carbon atoms in the molecule.

4. A method for preparing nitronitrites having the formula

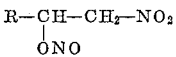

and dinitroparaffins having the formula

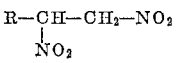

wherein R is a normal alkyl radical containing from 1 to 22 carbon atoms which comprises contacting a normal alpha-olefin having from 3 to 24 carbon atoms in the molecule and dissolved in a paraffinic hydrocarbon solvent having from 6 to 24 carbon atoms in the molecule with a nitrating agent consisting of an equilibrium mixture of NO₂ and N₂O₄ at a temperature in the range from 50° C. to 150° C. and thereafter recovering the nitronitrite and dinitroparaffin product by distilling said solvent and remaining nitrating agent therefrom.

5. The method according to claim 4 wherein the temperature is in the range from 50° C. to 90° C. and the paraffinic hydrocarbon solvent has from 6 to 15 carbon atoms in the molecule.

6. A method for preparing nitronitrites having the formula

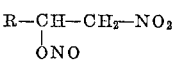

and dinitroparaffins having the formula

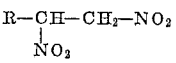

werein R is a normal alkyl radical containing from 1 to 22 carbon atoms which comprises contacting a normal alpha-olefin having from 3 to 24 carbon atoms in the molecule and dissolved in a paraffinic hydrocarbon solvent having from 6 to 24 carbon atoms in the molecule with a nitrating agent consisting of an equilibrium mixture of NO₂ and N₂O₄ at a temperature in the range from 50° C. to 150° C., stripping the remaining nitrating agent from the solution of the reaction products with an inert gas and recovering the solution of nitronitrite and dinitroparaffin product in said paraffinic hydrocarbon solvent.

7. The method according to claim 6 wherein the temperature is in the range from 50° C. to 90° C. and the paraffinic hydrocarbon solvent has from 6 to 15 carbon atoms in the molecule.

8. A method for preparing 1-nitro-2-propanol nitrite and 1,2-dinitropropane which comprises contacting propylene dissolved in a paraffinic hydrocarbon solvent having from 6 to 15 carbon atoms in the molecule with a nitrating agent consisting of an equilibrium mixture of NO₂ and N₂O₄ at a temperature in the range of from 50° C. to 90° C. and thereafter recovering the 1-nitro-2-propanolnitrite and 1,2-dinitropropane by distilling the solvent and remaining nitrating agent therefrom.

9. A method for preparing 1-nitro-2-propanol nitrite and 1,2-dinitropropane which comprises contacting propylene dissolved in a paraffinic hydrocarbon solvent having from 6 to 15 carbon atoms in the molecule with a nitrating agent consisting of an equilibrium mixture of NO₂ and N₂O₄ at a temperature in the range of from 50° C. to 90° C., stripping the remaining nitrating agent from the solution of the reaction products with an inert gas and recovering the solution of 1-nitro-2-propanolnitrite and 1,2-dinitropropane in said paraffinic hydrocarbon solvent.

10. A method for preparing 1-nitro-2-hexanol-nitrite and 1,2-dinitrohexane which comprises contacting hexene-1 dissolved in a paraffinic hydrocarbon solvent having from 6 to 15 carbon atoms in the molecule with a nitrating agent consisting of an equilibrium mixture of NO₂ and N₂O₄ at a temperature in the range of from 50° C. to 90° C. and thereafter recovering the 1-nitro-2-hexanolnitrite and 1,2-dinitrohexane by distilling the solvent and remaining nitrating agent therefrom.

11. A method for preparing 1-nitro-2-hexanolnitrite and 1,2-dinitrohexane which comprises contacting hexene-1 dissolved in a paraffinic hydrocarbon solvent having from 6 to 15 carbon atoms in the molecule with a nitrating agent consisting of an equilibrium mixture of NO₂ and N₂O₄ at a temperature in the range of from 50° C. to 90° C., stripping the remaining nitrating agent from the solution of the reaction products with an inert gas and recovering the solution of 1-nitro-2-hexanolnitrite and 1,2-dinitrohexane in said paraffinic hydrocarbon solvent.

12. A method for preparing 1-nitro-2-octanolnitrite and 1,2-dinitrooctane which comprises contacting octene-1 dissolved in a paraffinic hydrocarbon solvent having from 6 to 15 carbon atoms in the molecule with a nitrating agent consisting of an equilibrium mixture of NO₂ and N₂O₄ at a temperature in the range of from 50° C., to 90° C. and thereafter recovering the 1-nitro-2-octanolnitrite and 1,2-dinitrooctane by distilling the solvent and remaining nitrating agent therefrom.

13. A method for preparing 1-nitro-2-octanolnitrite and 1,2-dinitrooctane which comprises contacting octene-1 dissolved in a paraffinic hydrocarbon solvent having from 6 to 15 carbon atoms in the molecule with a nitrating agent consisting of an equilibrium mixture of NO₂ and N₂O₄ at a temperature in the range of from 50° C. to 90° C., stripping the remaining nitrating agent from the solution of the reaction products with an inert gas and recovering the solution of 1-nitro-2-octanolnitrite and 1,2-dinitrooctane in said paraffinic hydrocarbon solvent.

14. A method for preparing 1-nitro-2-hexadecanol-nitrite and 1,2-dinitrohexadecane which comprises contacting hexadecene-1 dissolved in a paraffinic hydrocarbon solvent having from 6 to 15 carbon atoms in the molecule with a nitrating agent consisting of an equilibrium mixture of NO₂ and N₂O₄ at a temperature in the range of from 50° C. to 90° C. and thereafter recovering the 1-nitro-2-hexadecanolnitrite and 1,2-dinitrohexadecane by distilling the solvent and remaining nitrating agent therefrom.

15. A method for preparing 1-nitro-2-hexadecanolnitrite and 1,2-dinitrohexadecane which comprises contacting hexadecene-1 dissolved in a paraffinic hydrocarbon solvent having from 6 to 15 carbon atoms in the molecule with a nitrating agent consisting of an equilibrium mixture of NO₂ and N₂O₄ at a temperature in the range of from 50° C. to 90° C., stripping the remaining nitrating agent from the solution of the reaction products with an inert gas and recovering the solution of 1-nitro-2-hexadecanolnitrite and 1,2-dinitrohexadecane in said paraffinic hydrocarbon solvent.

16. A method for preparing 1-nitro-2-docosanolnitrite and 1,2-dinitrodocosane which comprises contacting docosene-1 dissolved in a paraffinic hydrocarbon solvent having from 6 to 15 carbon atoms in the molecule with a nitrating agent consisting of an equilibrium mixture of $NO_2$ and $N_2O_4$ at a temperature in the range of from 50° C. to 90° C. and thereafter recovering the 1-nitro-2-docosanolnitrite and 1,2-dinitrodocosane by distilling the the solvent and remaining nitrating agent therefrom.

17. A method for preparing 1-nitro-2-docosanolnitrite and 1,2-dinitrodocosane which comprises contacting docosene-1 dissolved in a paraffinic hydrocarbon solvent having from 6 to 15 carbon atoms in the molecule with a nitrating agent consisting of an equilibrium mixture of $NO_2$ and $N_2O_4$ at a temperature in the range of from 50° C. to 90° C., stripping the remaining nitrating agent from the solution of the reaction products with an inert gas and recovering the solution of 1-nitro-2-docosanolnitrite and 1,2-dinitrodocosane in said paraffinic hydrocarbon solvent.

No references cited.

REUBEN EPSTEIN, *Acting Primary Examiner.*

UNITED STATES PATENT OFFICE
CERTIFICATE OF CORRECTION

Patent No. 3,192,248

June 29, 1965

Giovanni A. Bonetti et al.

It is hereby certified that error appears in the above numbered patent requiring correction and that the said Letters Patent should read as corrected below.

Column 2, line 71, for "or" read -- of --; column 5, line 6, for "2,2,4-trimethylpentene" read -- 2,2,4-trimethylpentane --; line 69, for "three-nicked" read -- three-necked --; column 6, lines 21 and 22, for "absorbed" read -- adsorbed --.

Signed and sealed this 21st day of December 1965.

(SEAL)
Attest:

ERNEST W. SWIDER
Attesting Officer

EDWARD J. BRENNER
Commissioner of Patents